INVENTOR:
WILLIAM J. McCONNELL,
BY: Donald G. Dalton
his Attorney.

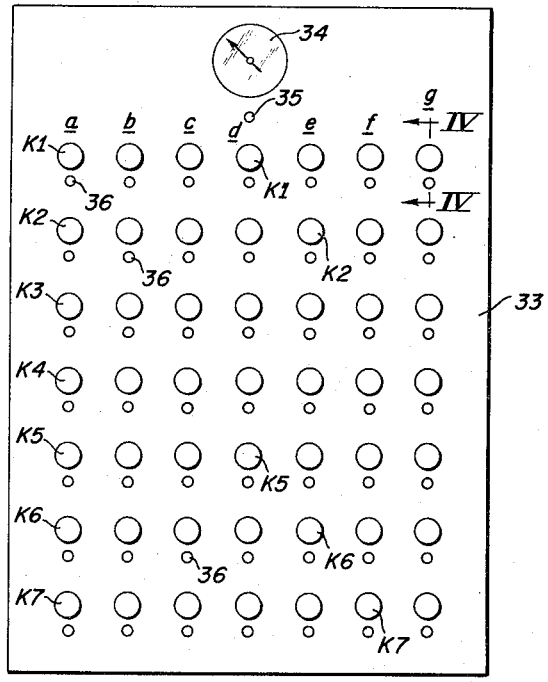
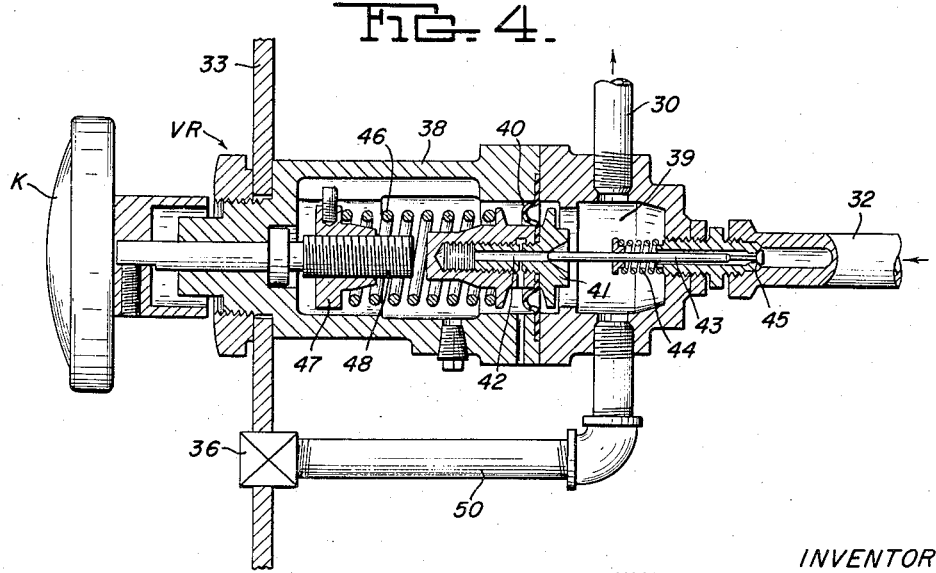

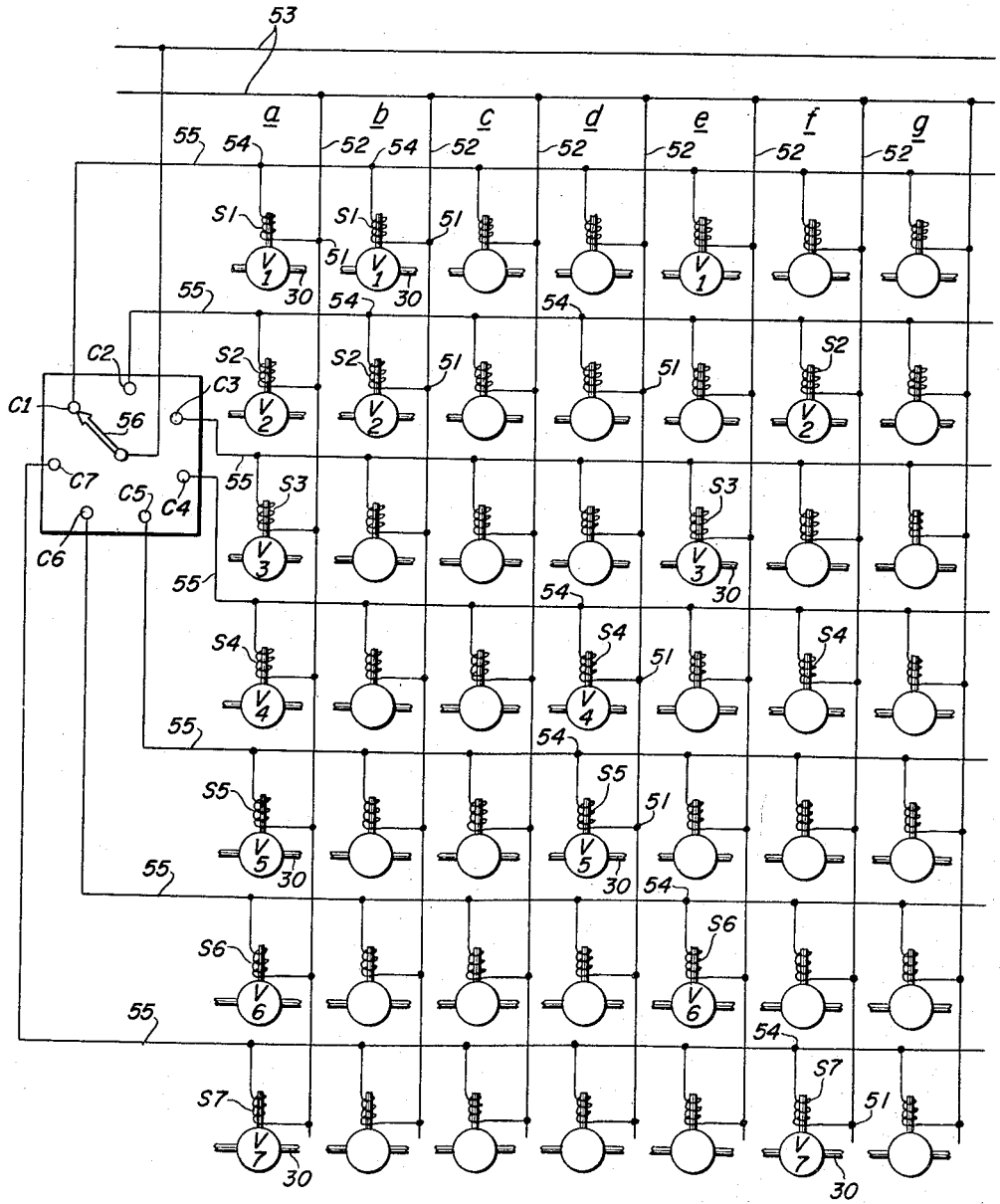

United States Patent Office 2,919,122
Patented Dec. 29, 1959

2,919,122

PRESET CONTROL SYSTEM FOR OPEN-HEARTH FURNACE

William J. McConnell, Ewing, N.J.

Application March 21, 1956, Serial No. 572,869

4 Claims. (Cl. 263—15)

This invention relates, as indicated, to a preset control system for open hearth furnaces. More particularly, it relates to a system which will program the operation of an open hearth furnace over successive heating cycles respectively having a plurality of operating stages. In a manner to be described, the invention also contemplates improvements for producing heating and flame conditions of a predetermined character according to the requirements of each stage of furnace operation.

The tapping of each heat from an open hearth furnace is preceded by a heating cycle which is comprised of several operating stages. The number of stages in the heating cycle will vary for different open hearth procedures and is somewhat dependent on the charging practice. For example, in one common charging practice using a charge of limestone, ore, scrap and cold pig iron, and a subsequent addition of molten pig iron, the heating cycle will be comprised of five operating stages which are generally designated as follows: melt down; hot metal addition; ore boil; lime boil; and working. The appearance of the bath and the chemical reactions taking place during these stages are well known and need not be considered here, it being sufficient to observe only that they occur successively in the order just mentioned and last for different intervals of time. The operator in charge, generally called the first helper, is charged with the responsibility of determining when one stage is at an end and the furnace operation must be changed for a succeeding stage.

Each of the stages of furnace operation requires a different fuel input or heating condition and different flame condition in the furnace. During the melt down stage when the temperature of the charge is relatively low, a relatively high and maximum rate of fuel input with a flame that is spread uniformly over the charge is desired. The ability of the furnace refractories, particularly the roof refractories, to withstand heat of course places a severe restriction or limit on the heating rate both in the melt down stage and subsequent stages. In the subsequent stages, the bath is at a high temperature and relatively greater percentages of the heat supplied to the furnace by the fuel are absorbed by the furnace refractories and, in these stages, the rate of fuel input must be reduced. The subsequent stages of course require respectively different heating rates, this being due in part to the chemistry of the process and the heat derived from the charge, for example, from more rapid oxidation of carbon in some of the subsequent stages than in others, as well as different flame conditions.

In addition to the operating stages, other furnace conditions arise in which still different heat inputs are required. When the furnace is in a stand-by or off condition, a heat input balanced against furnace heat losses is required to prevent cooling of the furnace and to enable its being placed in operation with a minimum loss of time. Still another different firing operation is required when renewing the bottom in the furnace. With a charging practice requiring a heat cycle of five operating stages as described above, it will be apparent that these stand-by and bottom making operations in effect increase the number of different firing requirements or stages to a total of seven.

In addition to determining when any given stage furnace operation has been completed, the furnace first helper is charged with the responsibility of making the adjustments required to provide proper heating and flame conditions for each of the stages of furnace operation. Several factors affect operation of the furnace and under conventional practice are regulated manually at the end of the various stages of operation. In addition to regulating the relative rates of supply of fuel and air, it may be necessary to adjust the stack dampers to regulate furnace pressure and the supply of oxygen must be regulated where it is used to supplement air. The use of multiple fuels of course increases the number of adjustments to be made and, where coke-oven tar is used as a fuel, the rate of supply of atomizing steam must also be regulated. If the tar is supplemented by oil, additional regulations for the oil and for oil atomizing steam are introduced. Under conventional practice, each of these factors is under the control of a valve which is regulated at the end of each stage by manual operation of a control knob located at the main control panel. Even though schedules are posted at the main control panel which give suggested values for each of the factors to be regulated, the number of adjustments to be made is such that accurate and proper adjustment of the controls for each factor is frequently not made. If one or more factors are not regulated accurately and the furnace as a consequence is not operating properly, the first helper may be persuaded to change factors other than the ones at fault in an attempt to improve the furnace operation. In any event, and since the operation of an open hearth furnace is entirely under manual control, successive heating cycles are not uniform and furnace operation varies widely under the control of different first helpers.

One of the principal objects of this invention is to provide a control system for open hearth furnaces which will secure uniform furnace operation over a large number of successive heats or operating cycles independently of the skill of the operator.

A further object is to provide an open hearth furnace control system which will furnish predetermined heating and flame conditions in the different stages of an operating cycle and which will furnish the same conditions in similar stages of successive cycles.

A still further object of the invention is to provide improvements in an open hearth control system which are directed to the end of obtaining predetermined conditions of each factor affecting furnace operation during the different stages of an operating cycle, and which will reproduce such conditions in similar stages of succeeding cycles.

Another object of the invention is to provide an improved open hearth furnace control system in which each of the factors affecting furnace operation is placed under the control of a plurality of preset control relays and in which regulation of such factors for any given stage of operation can be affected conveniently by selectively operating the relay provided for such stage of operation.

Still another object of the invention is to provide a control system of the character just referred to in which the preset control relays are selectively operated by a single manual control knob having as many operating positions as there are stages of furnace operation. A related object involves the provision of separate operating instrumentalities for each of the relays which are rendered operative in response to movement of the manual control knob to its operating position.

A more specific object of the invention is to provide an open hearth control system which includes a control knob movable manually to as many different positions as there are stages of furnace operation, a plurality of controls respectively regulating the factors affecting furnace operation, separate sets of plural relays for operating each of the furnace factor controls, and means responsive to movement of the control knob to each of its positions for operating a relay in each of said sets. A still more specific object of the invention is to provide in a control system of this character pneumatic relays which are preset to produce when operated a pneumatic pressure which will effect a predetermined regulation of the furnace factor control operated thereby.

Other objects and advantages of the invention will become apparent from the following description.

In the drawings there is shown a preferred embodiment of the invention. In this showing:

Figure 2 is a front elevational view of a control panel on which the relays of the control system are mounted;

Figure 3 is a diagrammatic illustration of a control circuit for operating the relays of this invention; and Figure 4 is a sectional view taken substantially along the line IV—IV of Figure 2.

Figure 1:
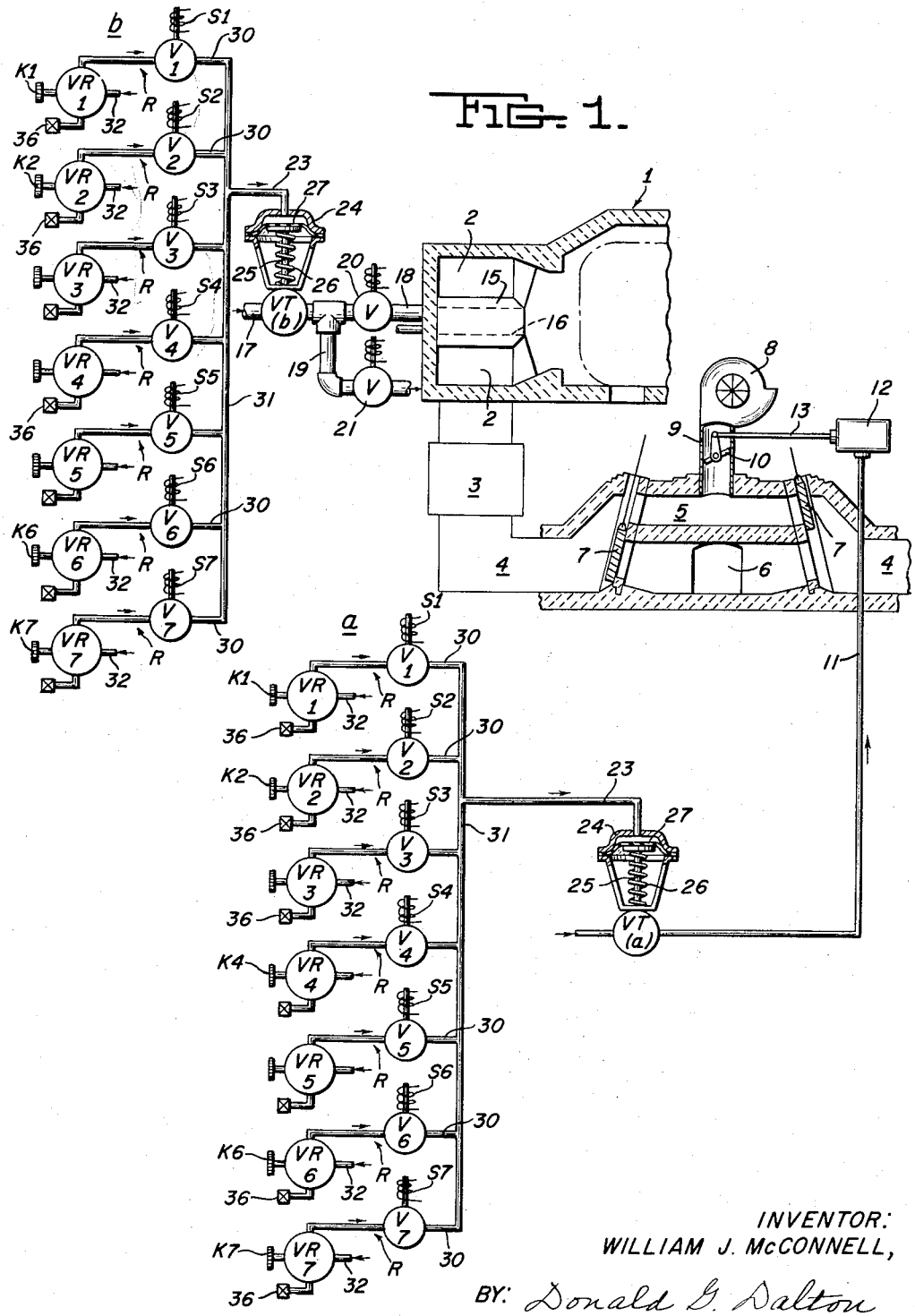
Figure 1 is a fragmentary and diagrammatic showing of an open hearth furnace and of the control system of this invention.

In a manner which will become more apparent, the system of this invention places each factor which affects the furnace operation and which must be regulated to provide the required flame and heating conditions under the control of a group of relays which are respectively preset and selectively operated to provide the desired conditions of such factor during the different stages of furnace operation. Each of such factors thus has as many preset control relays as there are stages of furnace operation. In the following description, the control system will be described as applied to an open hearth furnace having seven stages of operation respectively as follows: stand-by or off; making bottom; melt down; hot metal addition; lime boil; ore boil; and working, and which will be respectively designated by the numerals 1 through 7. The system will be further described as applied to an open hearth furnace using tar and oil as a fuel and which thus will have at least seven factors to be regulated to provide the required flame and heating conditions in the furnace for each stage of operation. These factors, designated respectively by the letters $a$ through $g$, respectively are as follows: air supply $a$; oil supply $b$; steam supply for atomizing oil $c$; tar supply $d$; steam for atomizing tar $e$; oxygen supply $f$; and furnace pressure $g$. With seven factors to be regulated and seven stages of furnace operation, it will be apparent that the system of this invention will require as many as forty-nine preset relays for controlling the operation of the furnace during its various stages. Obviously, a single relay may serve the purpose of two or more relays where the condition of any factor is the same in two or more stages of furnace operation and, in such case, a smaller number of relays will be sufficient. In a manner also to be described, each of the separate relays, designated as a whole by the letter R in Figure 1 of the drawings, is comprised of a reducing valve VR having a control knob K for manually adjusting its setting, a shut-off valve V controlling the connection of the pressure regulating valve VR to a throttle valve VT, and a solenoid S for actuating the valve V to its on position for rendering the relay operative.

In Figure 1 of the drawings, one end of an open hearth furnace 1 is shown as having vertically extending uptakes 2 through which the air for combustion and the gaseous products of combustion have reverse flow under the control of the usual reversing mechanism. The uptakes 2 are connected through checker-work 3 and passages 4 with an air supply passage 5 and a stack opening 6. Slide dampers 7 alternate the connections of the draft opening 6 and air passage 5 with the passages 4 in the usual manner. A fan 8 delivers air to the passage 5 through a conduit 9, the quantity of air so supplied being controlled by the position of a damper 10 in the conduit 9. The position of the damper 10 is controlled in accordance with the pressure of air in a conduit 11 which regulates the operation of a double-acting fluid pressure motor 12 having piston rod 13 for operating the damper 10 to control the rate of air supply to the furnace. A throttle valve VT($a$) controls the pressure in the conduit 11 in a manner to be described.

The internal pressure $g$ of the furnace 1 may be conveniently regulated by adjusting a damper (not shown but similar to the damper 10) in the stack connected to the opening 6. The position of the stack damper in such case would be regulated by a throttle valve VT($g$) and operating mechanism (not shown) similar to the valve VT($a$) and operating mechanism for the damper 10.

Each end of the furnace 1 has a dog house 15 for a burner 16. Fuel oil ($b$) is supplied to the burners 16 through a conduit 17 and branch conduits 18 and 19 under the control of solenoid operated reversing valves 20 and 21, the branch conduit 19 being connected to the burner nozzle 16 (not shown) in the opposite end of the furnace. The rate of oil supply is determined by a throttle valve VT($b$).

The burners 16 are, as indicated above, fed steam $c$ for atomizing oil, tar $d$, steam $e$ for atomizing tar, and oxygen $f$ for supplementing the air supply through conduits and branch conduits under the control of reversing valves similar to that just described for the oil $b$. The rates of supply of these factors of course are respectively controlled by the regulation of similar throttle valves (not shown) VT($c$), VT($d$), VT($e$), and VT($f$).

From the foregoing, it will be apparent that the factors $a$ through $g$ are respectively regulated by similar throttle valves VT. Each of the valves VT is actuated pneumatically in accordance with the pressure of air supplied through a conduit 23 to a fluid pressure motor 24 of the diaphragm type. The actuating mechanism for each valve VT includes a valve operating stem 25 which is normally held by a spring 26 in a position closing the valve and which is connected at its upper end with a diaphragm 27 in such manner that the amount of opening movement imparted to the valve VT is controlled by the pressure supplied to its control motor 24 through the conduit 23 connected therewith.

The parts thus far described and particularly the arrangement of the pneumatically actuated control valves VT for regulating the various factors which affect the furnace operation are conventional and form no part per se of this invention. Heretofore, the regulation of such factors has been effected at the end of each stage of furnace operation by a manual adjustment of valves controlling the air pressure in the conduits 23. A separate manual regulation of the pressure in each conduit 23 by the first helper at the end of each stage of furnace operation was thus required to obtain the desired heating and flame conditions in the furnace 1. In accordance with the principles of this invention, these manual adjustments by the first helper are eliminated and operation of each of the valves VT is controlled by a separate group of preset relays R. Since the groups of relays R are identically constructed, only the groups for operating the valves VT($a$) and VT($b$) have been shown in Figure 1 wherein such groups are indicated as a whole by the letters $a$ and $b$, it being understood that the groups for regulating the other factors $c$ through $g$ have an identical construction. Each group contains seven preset relays R since there are seven stages of furnace operation. In view of the identical construction of the relays R and the fact that there is a separate relay for each of the stages of furnace operation, the numeral suffix on the letters designating relay parts indicates the stage of furnace operation for which the relay is applicable.

As shown in Figure 1, each of the relays R has a delivery conduit 30 through which a pneumatic pressure signal is supplied to a pressure manifold 31 connected to a conduit 23. The pressure of the pneumatic signal sent through the delivery conduit 30 is controlled by a pressure reducing valve VR. Each of the valves VR has a connection 32 to a compressed air supply line (not shown) at a constant pressure and a control knob K which may be manually operated to regulate the pressurer delivered by it to the signal delivery conduit 30. Two-position shut-off valves V control the connections of the delivery conduits 30 with manifold 31. The valves V are of a conventional construction such that they are normally held in closed position and have a solenoid S for moving them to open position.

As shown in Figure 2, the relays are mounted on a panel board 33 with their control knobs K arranged in rows conveniently for adjustment. The control knobs K of the relays in the groups controlling each of the factors a through g are arranged in vertical rows as indicated. The relays corresponding to the different stages of furnace operation are arranged in horizontal rows as indicated. The panel board 33 also mounts a pressure gauge 34 to facilitate proper adjustment of each of the valves VR by the control knobs K. For this purpose, the gauge 34 includes a quick disconnect valve attachment 35 by which it may be quickly connected through an air hose with similar attachments 36 for the valves VR which are arranged below their respective control knobs K on the panel board 33. Since the regulation of the factors a through g effected by the pressures supplied to the fluid pressure motors 24 for actuating the throttle valves VT will have been previously calibrated, it will be apparent that the provision of the gauge 34 and connetcions 35 and 36 on the panel board 33 provides a convenient way for presetting the relays R to provide predetermined conditions of the factors a through g for any of the stages of furnace operation.

The pressure reducing valves VR are conventionally constructed and any one of several which are presently available on the market may be used for the purposes of this invention. One form and its manner of mounting on the panel board 33 is shown in Figure 4. In this showing, the valve VR is illustrated as comprising a housing 38 which is secured on the panel board 33 and has a chamber 39 into which the delivery conduit 30 and air supply conduit 32 have connections. A diaphragm 40 at one end of the chamber 39 mounts a valve seat 41 which has an exhaust port 42 for connection to the atmosphere. A valve rod 43 has a spring 44 biasing it to a position engaged with the valve seat 41 and closing the exhaust port 42 and with its other end engaged with a valve seat 45 disconnecting the air supply connection 32 from the chamber 39. The air pressure in the chamber 39 and supply conduit 30 is determined by the tension of a spring 46 which' has one end bearing against the diaphragm 40 and its other end bearing against a collar 47 which has threaded engagement on a shaft 48. The shaft 48 is connected with the control knob K for rotation thereby to adjust the axial position of the collar 47 and thereby the tension of the spring 46. The spring 46 is effective to move the diaphragm 40 and the valve rod 43 to the right to a position in which it moves out of seating engagement with the valve seat 45 and provides a connection between the air supply conduit 32 and the chamber 39. As pressure builds up in the chamber 39, the diaphragm 40 moves to the left and this movement will continue until such pressure balances the force exerted by the spring 46. If the pressure in the chamber 39 increases beyond that called for by the tension in the spring 46, the diaphragm 40 will move to the left so that air will be bled off through the exhaust port 42. If the pressure in the chamber 39 falls below that called for by the spring 46, the valve rod 43 will be moved to the right to admit more air to the chamber 39. A conduit 50 provides a connection between the chamber 39 and the panel board connectors 36.

Figure 3 shows a control circuit for effecting simultaneous stage energization of the solenoids S having the same numeral suffix in each of the relay sets a through g. In this showing, the solenoids S1 through S7 in each of the sets a through g are arranged in vertical rows which are designated by like letters in a manner similar to the showing of the control knobs K in Figure 2. The solenoids S1 through S7 in each of the sets a through g respectively have one terminal 51 connected by a vertically extending lead 52 to one side of a pair of current supply conductors 53. Each solenoid S having the same numeral suffix has its other terminal 54 connected to horizontal leads 55 in such manner that selective connection of the leads 55 to the other side of the current supply conductors 53 will be effective to energize all of the solenoids S having the same numeral suffix. Selective connection of the conductors 55 to the other side of the pair of current conductors 53 is effected by a plurality of stationary contacts C1 through C7, each of the conductors 55 being electrically connected to one of such contacts. The stationary contacts C1 through C7 are selectively energized by a rotatable manual contact 56. Upon rotation of the dial contact 56 to a position opposite a selected one of the contacts C1 through C7, the solenoids S having suffix corresponding to the contacts C energized by the dial 56 will be operated.

As indicated above, the valves VT and their operating motors 24 are part of a conventional open hearth control system which includes other control elements (not shown) of a complicated nature such as roof temperature cut-back controls, proportioning relays, line supply pressure compensators and the like. In this respect, it will be understood that such conventional systems are readily converted to the system of this invention by the simple expedient of connecting the groups of relays R to the motors 24 for the factors a through g and by placing operation of the relays R under the control of the contacts 56 and C1–C7 as shown in Figure 3. The system is then conditioned for its intended operation by adjusting the control knobs K1 through K7 on the panel board 33 so that the relays R for the corresponding furnace factors and stages of furnace operation will deliver predetermined air pressure to the motors 24 for the throttle valves VT controlled thereby. With the completion of these connections and adjustments, the control system of this invention is ready to provide a programmed control of the operation of an open hearth furnace and predetermined flame and heating conditions during the different stages of succeeding cycles.

The operation of the control system of this invention will be apparent from the foregoing and it will be sufficient to indicate that the operator need only to turn the dial contact 56 to engage a selected one of the contacts C1–C7 to effect a simultaneous adjustment of all of the factors controlling the heating operation of the furnace for any one of its selected stages of operation. Assuming that the furnace is in condition for receiving a charge of limestone, ore, and scrap, the operator will turn the dial contact 56 to engage the contact C3 to effect a simultaneous adjustment of all of the factors a through g to provide the predetermined flame and heating conditions for the third or melt-down stage of furnace operation. When the dial contact 56 engages the contact C3, all of the relays S3 will be energized and the pressure reducing valves VR3 will be rendered operative to deliver predetermined pressure signals to the motors 24 for their respective throttle valves VT. As soon as the first helper determines that the third or melt-down stage of operation is at an end, it is only necessary to turn the dial contact 56 to engage the stationary contact C4 to simultaneously regulate the factors a through g for the fourth or hot metal addition stage of operation. At the completion of the seventh or working stage of operation, the dial contact 56 is returned to its position engaging the contact C3 so that another cycle of furnace stage operations may be repeated. The heating and flame conditions in the furnace are of course predetermined by adjustment of the pressure reducing valves VR in the different relays R and will be identical during corresponding stages of operation in succeeding cycles.

While one embodiment of my invention has been shown and described it will be apparent that other adaptations and modifications may be made without departing from the scope of the following claims.

I claim:

1. In an open-hearth furnace having a fuel supply means, an air supply means, and means regulating the operation of each of said supply means including a pair of throttle valves and a pair of fluid pressure motors for actuating said throttle valves, the combination therewith, of an apparatus for programming the operation of said furnace over a heating cycle of several stages of furnace operation respectively requiring different heating conditions and correspondingly different rates of fluid and air supply which comprises, a manual control movable to a number of operating positions corresponding to the number of said stages of furnace operation, a separate group of a plurality of reducing valves associated with each of said throttle valve motors, there being one of said valves for each of said stages in each of said groups, and each of said reducing valves being operable to deliver fluid under a pressure predetermined according to the throttle valve actuation required for its stage of furnace operation by the fluid pressure motor with which it is associated, and means responsive to movement of said manual control to each of its said operating positions for selectively connecting a different one of said reducing valves in each of said groups with said fluid pressure motors comprising conduits connecting the reducing valves in each of said groups with the throttle valve motors associated therewith, a shut-off valve in each of said conduits, a solenoid for operating each of said shut-off valves, and an energizing circuit for selectively operating said solenoids in response to movement of said manual control to its said operating positions.

2. In an open-hearth furnace having a fuel supply means, an air supply means, and means regulating the operation of each of said supply means including a pair of throttle valves and a pair of fluid pressure motors for actuating said throttle valves, the combination therewith, of an apparatus for programming the operation of said furnace over a heating cycle of several stages of furnace operation respectively requiring different heating conditions and correspondingly different rates of fuel and air supply which comprises, a manual control means having a number of operating positions corresponding to the number of said stages of furnace operation, a separate group of a plurality of reducing valves associated with each of said throttle valve motors, there being one of said valves for each of said stages in each of said groups, and each of said reducing valves being operable to deliver fluid under a pressure predetermined according to the throttle valve actuation required for its stage of furnace operation by the fluid pressure motor with which it is associated, and means responsive to operation of said manual control means to each of its said operating positions for selectively connecting a different one of said reducing valves in each of said groups with said fluid pressure motors comprising conduits connecting the reducing valves in each of said groups with the throttle valve motors associated therewith, a shut-off valve in each of said conduits, a relay for operating each of said shut-off valves, and means for selectively operating said relays in response to operation of said manual control means to its said operating positions.

3. An apparatus as defined in claim 2 characterized by each of said reducing valves having a manually adjustable control for regulating its operation, and by means mounting the reducing valves in each of said groups in juxtaposed positions at a common control station rendering said manual controls readily accessible for regulating the operation of said valves.

4. An apparatus as defined in claim 3 characterized further by said mounting means comprising a panel board on which said groups of reducing valves are mounted in parallel rows with the manual controls of the reducing valves operated at the different stages of furnace operation arranged in rows extending transversely of said parallel rows.

References Cited in the file of this patent

UNITED STATES PATENTS

| | | |
|---|---|---|
| 1,627,770 | Durkee | May 10, 1927 |
| 2,158,095 | Vierow | May 16, 1939 |
| 2,390,902 | Vollrath | Dec. 11, 1945 |
| 2,612,319 | Wadenstein | Sept. 30, 1952 |
| 2,723,682 | Haney et al. | Nov. 15, 1955 |